United States Patent [19]
Garwood

[11] 3,995,591
[45] Dec. 7, 1976

[54] SELF-CLEANING BIRD BATH

[76] Inventor: Moody Ray Garwood, 781 Kiwana Drive, Youngstown, Ohio 44512

[22] Filed: Jan. 28, 1976

[21] Appl. No.: 653,210

[52] U.S. Cl. ................................................ 119/1
[51] Int. Cl.² ...................................... A01K 29/00
[58] Field of Search ....................... 119/1, 74, 78

[56] References Cited
UNITED STATES PATENTS

| | | | |
|---|---|---|---|
| 1,019,881 | 3/1912 | Byrd | 119/74 |
| 1,854,117 | 4/1932 | Devitt | 119/78 |
| 2,165,753 | 7/1939 | Hobbs | 119/74 |
| 3,696,786 | 10/1972 | Garwood | 119/1 |

*Primary Examiner*—Hugh R. Chamblee
*Attorney, Agent, or Firm*—Webster B. Harpman

[57] ABSTRACT

A self-cleaning bird bath having a vertical support stand and a shallow double walled bowl pivoted to the upper end thereof so as to be movable from a horizontal position to a substantially vertical position. A piston and cylinder assembly in said vertical support stand with the piston engaging the shallow bowl for tilting the same, a flexible conduit connecting the interior of the hollow bowl with the interior of the cylinder and a second tubular member for supplying water to the cylinder so as to move the piston and fill the shallow bowl by way of apertures in one of the double walls thereof whereby the amount of water delivered to the cylinder will tilt the shallow bowl and/or fill the same.

6 Claims, 4 Drawing Figures

SELF-CLEANING BIRD BATH

BACKGROUND OF THE INVENTION

1. Field of the Invention:

This invention relates to bird bath structures such as used for practical and decorative purposes in gardens.

2. Description of the Prior Art:

Prior structures of this type have generally comprised stands with shallow bowls on their upper ends and in fixed relation thereto. My earlier U.S. Pat. No. 3,696,786, issued Oct. 10, 1972 discloses a shallow bowl and weighted means for tilting the same.

The present invention comprises a hydraulically actuated self-cleaning bird bath which can either be refilled or tilted and refilled by varying the amount of water introduced into the structure as from a remotely controlled garden hose.

SUMMARY OF THE INVENTION

A self-cleaning bird bath is disclosed which comprises a hollow vertical stand with a pivot member at its uppermost end to which a shallow bowl is pivoted so that it can be tilted sideways to discharge the contents therefrom. The shallow bowl is preferably double walled with apertures in the inner wall communicating with the bowl. A piston and cylinder assembly is pivotally mounted in the hollow vertical stand with the piston rod thereof extending to a pivotal connection on the bottom of the shallow bowl. A flexible hose communicates with the interior of the shallow bowl and the area within the cylinder on the opposite side of the piston with respect to the bowl and a second tubular member communicates with the same area of the interior of the cylinder to supply water thereto from a remote source. Varying the amount of water introduced into the cylinder either refills the bowl or actuates the piston and tilts the bowl and then rinses the interior of the bowl and then refills the bowl when it is returned to horizontal position.

DESCRIPTION OF THE PREFERRED EMBODIMENT

Figure 1:
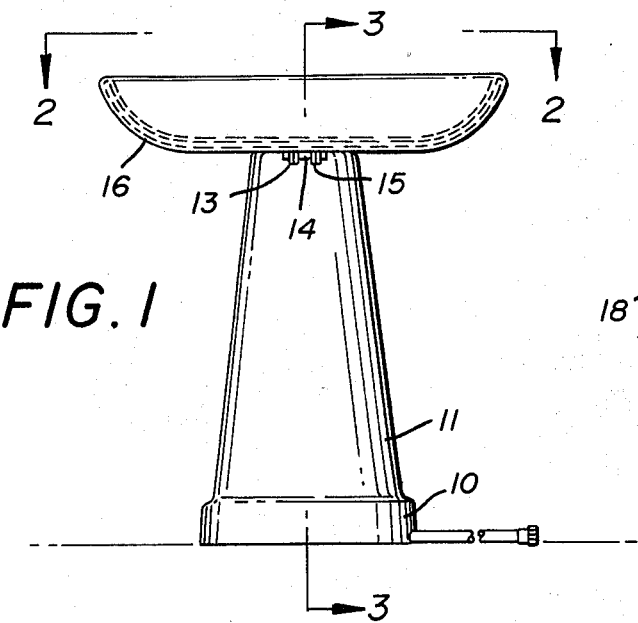
FIG. 1 is a side elevation of the bird bath showing the same in normal upright position.

In its simplest form the bird bath of the present invention comprises a base 10 having an integral upwardly extending frusto conical hollow body 11 the upper end 12 of which is open, a pair of apertured bosses 13 are positioned at one side of the open upper end 12 of the hollow body 11 and hold a pivot pin 14 which also passes through a pair of secondary apertured bosses 15 on the bottom wall 16 of a double walled shallow bowl, the inner wall of which is indicated by the numeral 17. Apertures 18 in the inner wall 17 communicate with the space between the walls 16 and 17.

A third pair of apertured bosses 19 are positioned on the bottom wall 16 of the shallow bowl in spaced relation to the bosses 15 and a pivot pin 20 positioned therethrough engages one end of a piston rod 21 which is attached to a piston 22 in a cylinder 23, one end of which is pivoted as by a pivot pin 24 to the interior of the hollow body 11 of the vertical stand.

Figure 3:
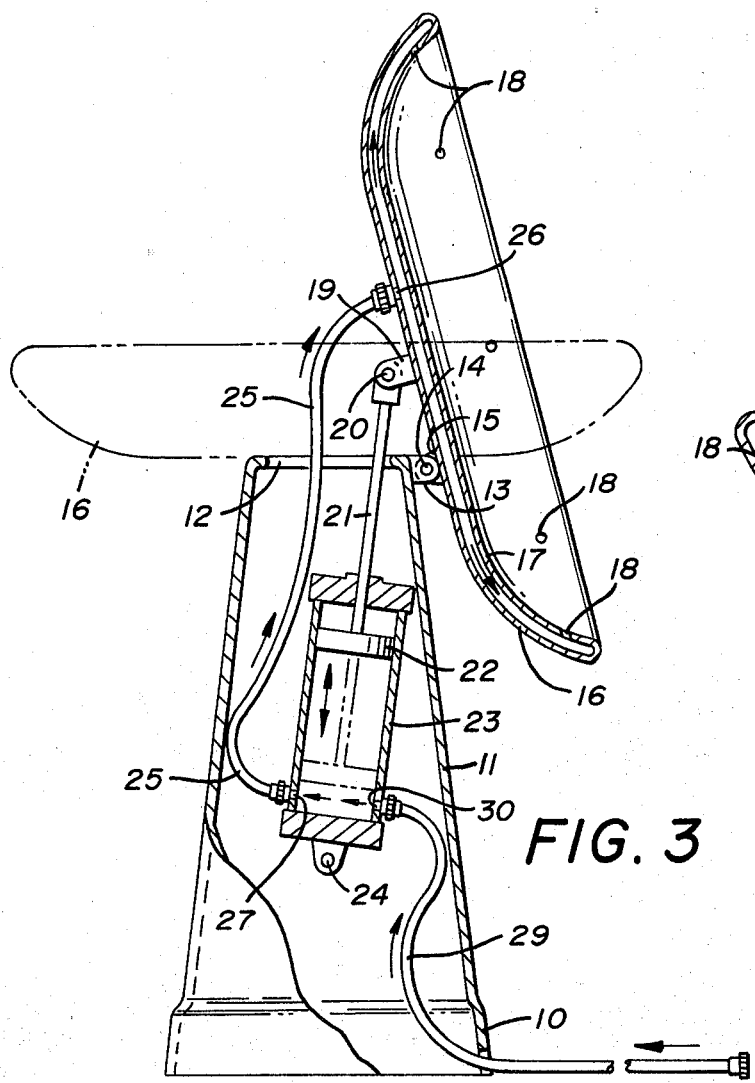
FIG. 3 is an enlarged vertical section on line 3—3 of FIG. 1 with parts broken away.

A flexible tube 25 establishes communication between the interior of the hollow walled shallow bowl and the lower portion of the cylinder 23 as seen in FIG. 3 of the drawings by way of openings 26 and 27 respectively. A secondary flexible tube 29 communicates with the interior of the cylinder 23 by way of a larger opening 30 as compared with the opening 27 and extends to a remote source of water such as a valved garden hose or the like.

Figure 2:
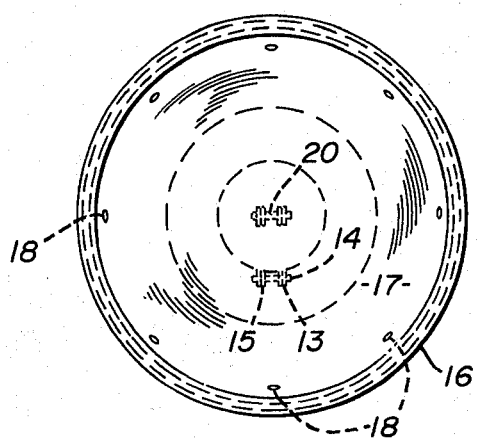
FIG. 2 is a top plan view on line 2—2 of FIG. 1.

By referring to FIG. 2 of the drawings, it will be seen that the broken line representation of the pivots 14 and 20 illustrate the relative positioning thereof with respect to the center of the shallow bowl defined by the inner and outer walls 17 and 16 and it will be obvious to one skilled in the art that when the shallow bowl is in horizontal position and filled with water it will take a given amount of energy to move it to the tilted position seen in FIG. 3 of the drawings where it will be self-cleaning and it will also occur to one skilled in the art that this necessary energy can be supplied by the piston and cylinder assembly comprising the piston 22 and cylinder 23 by introducing more water into the cylinder on the opposite side of the piston 22 with respect to the pivot 20 than can flow outwardly therefrom through the relatively smaller opening 27 heretofore referred to.

Figure 4:
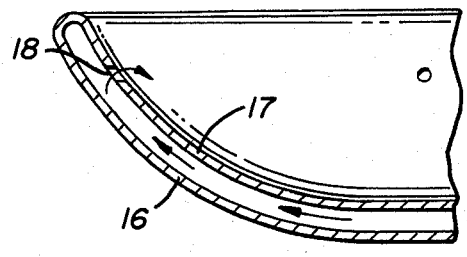
FIG. 4 is an enlarged detail of a portion of the shallow bowl of the bird bath seen in FIGS. 1, 2 and 3.

By referring now to FIG. 4 of the drawings which is an enlarged detail of a portion of the device seen in FIG. 3, it will be observed that the water will normally flow through the area between the double walls 16 and 17 of the shallow bowl and emerge through a plurality of openings 18 adjacent the rim of the bowl so as to effectively rinse the bowl in a self-cleaning operation or fill the same when it is in horizontal position.

It will thus be seen that a self-cleaning bird bath has been disclosed which may be conveniently easily controlled from a remote location as by way of a garden hose communicating therewith by simply varying the amount of water which flows to the device therethrough.

Although but one embodiment of the present invention has been illustrated and described it will be apparent to those skilled in the art that various changes and modifications may be made therein without departing from the spirit of the invention and having thus described my invention what I claim is:

I claim:

1. In a bird bath a combination of a vertical stand and a shallow bowl pivoted to the upper end thereof so as to be tiltable relative thereto, a piston and cylinder assembly pivotally connected between said vertical stand and said shallow bowl and flexible tubular means establishing communication between the hollow bowl and the cylinder of said piston and cylinder assembly and on the opposite side of the piston thereof with respect to the shallow bowl and secondary tubular means communicating with the cylinder on said opposite side of said piston for supplying water thereto.

2. The bird bath set forth in claim 1 wherein the shallow bowl comprises a double walled structure with a series of apertures in the inner wall and wherein the flexible tubular means communicates with the area between the double walls.

3. The bird bath set forth in claim 1 and wherein the shallow bowl is of a configuration permitting all of the water to flow outwardly thereof where it is in substantially vertial position.

4. The bird bath set forth in claim 1 and wherein the means establishing communication between the cylinder of the piston and cylinder assembly and the shallow bowl includes a restriction reducing the amount of water that can flow therethrough as compared with the amount of water that can flow into the cylinder through the secondary means.

5. The bird bath set forth in claim 1 and wherein pivot members pivoting said shallow bowl to the upper end of said vertical stand are located adjacent the side wall of the vertical stand and offcenter with respect to the shallow bowl and wherein secondary pivot members on the substantial center of the shallow bowl engage a piston rod of said piston and cylinder assembly, said pivot members being spaced with respect to one another on said shallow bowl.

6. In a bird bath a combination of a vertical stand and a shallow bowl pivoted to the upper end thereof so as to be tiltable relative thereto, an expansible device connected between said vertical stand and said shallow bowl and flexible tubular means establishing communication between the hollow bowl and the expansible device and secondary tubular means communicating with the expansible device for supplying water thereto.

* * * * *